United States Patent
Walker

[15] 3,655,208
[45] Apr. 11, 1972

[54] SPLIT PISTON RING AND METHOD OF MANUFACTURE

[72] Inventor: James V. Walker, Redondo Beach, Calif.
[73] Assignee: McDonnell Douglas Corporation
[22] Filed: Apr. 13, 1970
[21] Appl. No.: 27,961

[52] U.S. Cl..............................277/221, 277/222, 29/156.6
[51] Int. Cl..........................................F16j 9/06, F16j 9/14
[58] Field of Search..................277/216, 220, 221, 222, 219

[56] References Cited

UNITED STATES PATENTS

| | | | |
|---|---|---|---|
| 1,261,897 | 4/1918 | Bernard | 277/221 |
| 3,455,565 | 7/1969 | Jepsen | 277/222 X |
| 1,106,054 | 8/1914 | Owens | 277/216 |
| 1,274,038 | 7/1918 | Hilker | 277/221 |
| 1,346,237 | 7/1920 | Murray | 277/222 |
| 1,353,082 | 9/1920 | Stehle | 277/221 |
| 1,975,344 | 10/1934 | Baker | 277/219 |
| 2,052,160 | 8/1936 | Barnes | 277/216 |
| 2,485,862 | 10/1949 | Caza | 277/221 |
| 2,499,952 | 3/1950 | Harbison | 277/220 |

*Primary Examiner*—Samuel B. Rothberg
*Attorney*—Walter J. Jason, Donald L. Royer and George W. Finch

[57] ABSTRACT

A plastic or plastic-like piston ring of the expandable type for use in hydraulic and pneumatic actuators is constructed from a single annular member and the expansion and contraction capabilities are provided by partially radially slitting the ring and by cutting a pair of stepped joints through opposite sides of the ring.

4 Claims, 10 Drawing Figures

Patented April 11, 1972
3,655,208
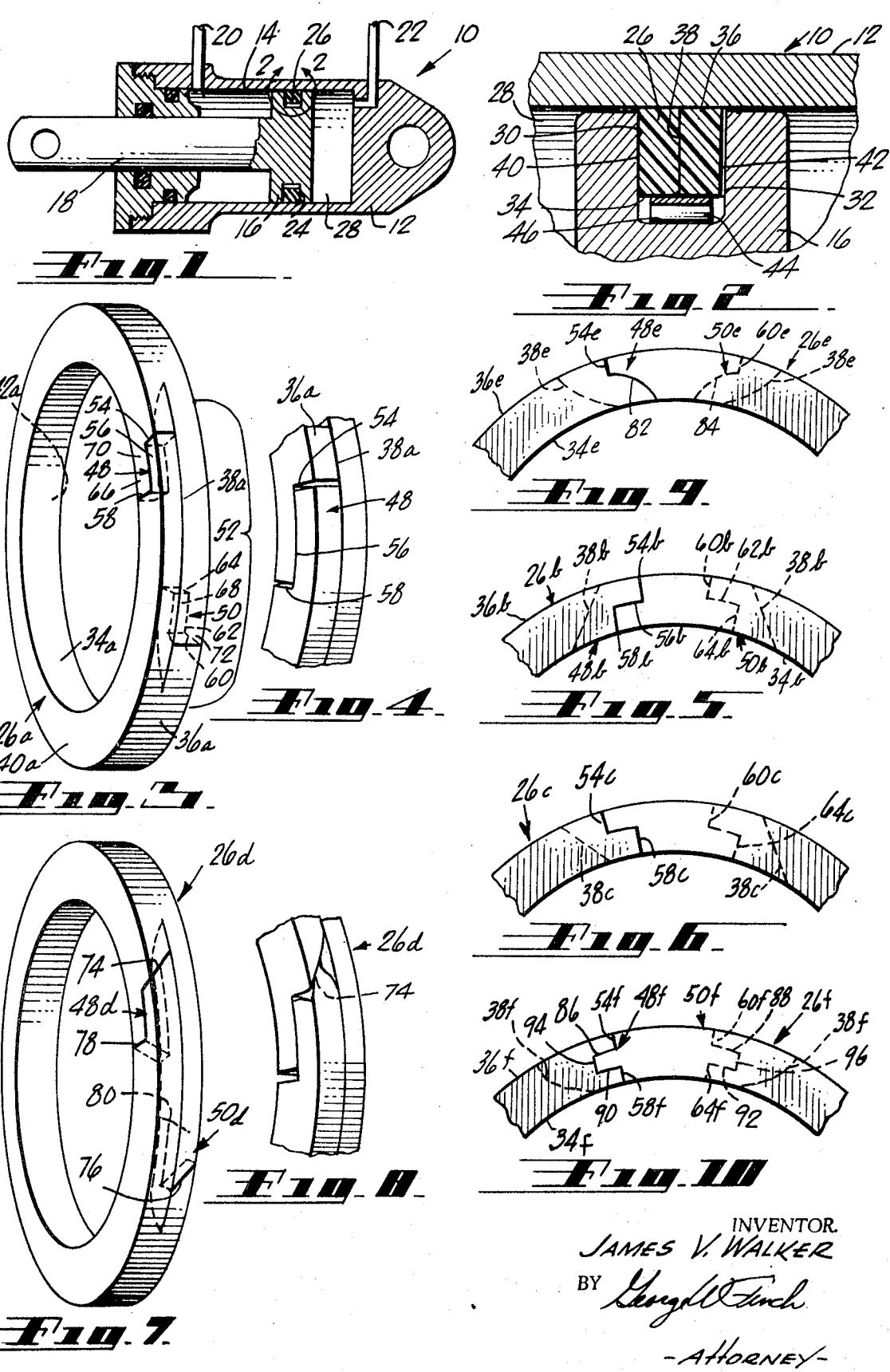
INVENTOR.
JAMES V. WALKER
BY George A. Finch
—Attorney—

SPLIT PISTON RING AND METHOD OF MANUFACTURE

BACKGROUND OF THE INVENTION

Many piston rings are in existance and are used in a great variety of ways and for many purposes, including metal piston rings which still occupy an extremely important spot in certain fields. However, such metal piston rings have definite limitations when used in actuators of the hydraulic or pneumatic type, especially with respect to aircraft applications where only small amounts of friction and leakage can be tolerated. In such applications it has been found to be advantageous to use piston rings constructed of a plastic such as tetrafluoroethylene (Teflon) obtainable from E. I. du Pont de Nemours & Company, Wilmington, Del. The Teflon piston rings that have been used heretofore in aircraft actuators have been of the dual piston ring type in which two split piston rings are placed in side-by-side position in a piston ring groove with their end gaps at different radial locations about the piston. These rings require keying of some sort therebetween so the end gaps do not become aligned as the actuator is operated, such undesirable gap alignment causing substantial leakage therethrough which gets worse as the rings wear and the end gaps widen. Although they have become almost universally used in the aircraft flight control actuator field, keyed dual split piston rings have several disadvantages. For example, the keying of the rings is usually accomplished by cutting a longitudinal keyway in each ring at predetermined locations in the interior concentric surfaces thereof to assure the end gaps do not align. The removal of material as the keyways are formed of course reduces the radial wall thickness of the rings in the areas of the keyways and adversely effects the piston rings by changing their otherwise relatively symmetrical expansion and wear characteristics. Cutting a keyway in the piston ring also increases the cost of raw materials therefor since the material removed when cutting the keyway is usually wasted. Not only is the manufacture of such keyed dual piston rings more expensive then it need be, such rings are also difficult and time consumming to install. This is because in the normal case the installer must insert a piston ring expander in the piston ring groove, peripherally align the two split piston rings, install the key in the common keyway therebetween and while maintaining the key in the keyway, install the split rings in the piston ring groove of the piston. Such rings also require special care as to the type and orientation of the piston ring expander since the expander must push equally on each piston ring in the piston ring groove or trouble results.

These and other disadvantages and shortcomings of the known piston ring devices are overcome by the present invention which teaches the construction and operation of a relatively simple, inexpensive and easily installed piston ring which can be constructed relatively easily and which is compact, lightweight and trouble-free. The present piston ring is particularly well suited to applications such as in aircraft control actuators where very little friction or backlash can be tolerated but where an absolutely no leak seal is not required.

SUMMARY OF THE INVENTION

The present piston ring is of the expandable type and is constructed of a plastic or plastic-like material such as Teflon. The ring is constructed from a single integral ring member which is partially radially slit by knife or other means which will not substantially remove any of the Teflon material. A pair of staggered step joints are then cut by similar knife means from opposite sides of the ring to the radial slit near the opposite ends thereof. The orientation, spacing and contour of the step joints can be varied to make the ring adaptable to various applications. The piston ring which results is relatively inexpensive, trouble-free and is quite insensitive to misaligned piston ring expanders. This particular type of piston ring is also relatively insensitive to wear since it can maintain sealing even though substantial portions thereof may be worn away. In some embodiments thereof the wearing of the ring is compensated for by the orientation of the step joints so that the ring material tends to coldflow into spaces caused by wear thereof and in a sense be self-healing.

It is therefore the principle object of the present invention to provide a relatively simple, split-type piston ring which requires no keying.

Another object is to provide a plastic piston ring for use in hydraulic and pneumatic actuators which can be quickly and easily installed.

Another object of this invention is to provide a plastic piston ring which is relatively inexpensive to manufacture.

Another object is to provide a rugged plastic piston ring which because of its even wear characteristics has a relatively long operational life.

Another object is to provide a plastic piston ring that can adjust itself to provide an operable seal even when it and/or the cylinder in which it operates is in a worn condition.

Another object is to provide a method to easily and economically construct a plastic piston ring with a minimum of waste material.

Another object is to reduce backlash effects with pressure reversal in a hydraulic or pneumatic actuator.

Another object is to provide a relatively low leakage piston ring formed of a single integral member.

Another object is to provide a piston ring which can be used with various types of piston ring expanders with no degradation in performance.

Another object is to provide a piston ring for hydraulic or pneumatic systems which produces a minimum of operating friction with the cylinder wall in which it is used.

These and other objects and advantages of the present invention will become apparent after considering the following detail specification which covers particular embodiments thereof in conjunction with the accompanying drawing.

BRIEF DESCRIPTION OF THE DRAWING

FIG. 1 is a cross-sectional view of a hydraulic actuator including a piston with a piston ring constructed according to the present invention installed therein.

FIG. 2 is an enlarged fragmentary cross-sectional view of the portion of FIG. 1 encircled by line 2—2 showing details of the piston ring in operation, sealing the space between the piston and the actuator cylinder wall.

FIG. 3 is a perspective view of a split piston ring constructed according to the present invention.

FIG. 4 is a perspective view of a portion of the split piston ring of FIG. 3 as it appears when worn and/or when placed in a worn cylinder.

FIGS. 5 and 6 are fragmentary side views of split piston rings having step joint portions similar to those of the ring shown in FIG. 3.

FIG. 7 is a perspective view of another piston ring embodying features of the present invention.

FIG. 8 is a perspective view of a portion of the split piston ring of FIG. 7 in a worn condition.

FIGS. 9 and 10 are fragmentary side views of split piston rings showing various step joint configurations.

DESCRIPTION OF THE SHOWN EMBODIMENTS

Referring to the drawing more particularly by reference numbers, number 10 in FIG. 1 refers to a hydraulic or pneumatic actuator such as those commonly employed in the aircraft industry. The actuator 10 is comprised of a body portion 12 with a cylinder 14 formed therein, a piston 16 and a connecting rod 18 which is shown integral with the piston 16. The piston 16 is positioned within the cylinder 14 and is moved axially therethrough by hydraulic or pneumatic pressure applied by means of lines 20 or 22 which are connected to a suitable pressure source (not shown). The piston 16 includes a radial groove 24 in which a plastic or plastic-like ring 26 constructed according to the present invention, is installed. The piston ring 26 when installed in the radial groove 24 extends outwardly against the wall 28 of the cylinder 14 to seal the area between the piston 16 and the cylinder wall 28 so that very little fluid or gas can flow from one side of the piston 16 to the other.

FIG. 2 shows an enlarged fragmentary view of the groove 24 with the piston ring 26 installed therein and a portion of the adjacent cylinder wall 28. The relative positions of the elements shown in FIG. 2 indicate that the piston 16 is being moved from right to left; that is, with a greater pressure being applied to the right hand side thereof than the left hand side. This differential pressure causes the piston ring 26 to move to the left to seal itself against the left hand wall 30 of the piston ring groove 24. The relatively higher pressure fluid or gas from the right hand side of the cylinder 14 is therefore able to flow between the piston ring 26 and the right hand side wall 32 of the groove 24. This causes pressure to be applied to the inner circumferential surface 34 of the piston ring 26 substantially seals the area between the piston 16 and the cylinder wall 28. The piston ring 26 includes a radial slit 38 made in a plane at right angles to the axis of the piston ring and parallel to the side walls 40 and 42 thereof. The slit 38 is also sealed by the application of differential pressure to one or the other sides of the piston ring 26.

A piston ring expander 44 is positioned between the bottom wall 46 of the groove 24 and the inner circumferential surface 34 of the piston ring 26 to urge the piston ring 26 outwardly against the cylinder wall 28. The ring expander 44 may take any one of several conventional forms including a marcel ring, elliptical ring and serpentine spring strip or it may be constructed from a resilient member such as one made of rubber. The ring expander 44 causes the piston ring 26 to remain in contact with the cylinder wall 28 even when no differential pressure is acting thereon or when the cylinder wall 28 has substantial changes in cylinder bore diameter caused either by normal variations due to fabrication tolerances and imperfections in the bore or by an increase in bore diameter resulting from cylinder wall deflection when it is being subjected to relatively high pressure.

FIG. 3 illustrates a piston ring 26a constructed according to the present invention. The piston ring 26a which may be constructed from Teflon or Teflon-like material includes the aforementioned radial slit 38a which is preferably positioned midway between and parallel to the side faces or walls 40a and 42a of the piston ring 26a. The radial slit 38a extends through the piston ring 26a in a predetermined arc which is exaggerated in the FIGS. 3 and 4. The slit 38a is preferably formed by cutting the piston ring 26a with means which do not remove any of the Teflon material and which produce very little, if any, distortion of the piston ring 26a. Suitable cutting means which have been employed include razor blades and circular knives. Some distortion during cutting of the rings 26a can be tolerated since Teflon or Teflon-like material has a tendency to "coldflow" when the operating pressures used in actuators 10 are applied. These "coldflow" characteristics enable the ring 26a to heal itself.

Step joints 48 and 50 are made within the arculate slit portion 52 of the piston ring 26a between the radial slit 38a and the side walls 40a and 42a respectively. The step joint 48 includes a radial axially aligned cut 54 extending from the outer surface 36a of the piston ring 26a to a centrally located approximately concentric cut 56 while another radial axially aligned cut 58 extends from the inner surface 34a of the piston ring 26a outwardly to the concentric cut 56. The other step joint 50 also includes a radial cut 60 extending inwardly from the outer surface 36a to a centrally located approximately concentric cut 62 and another radial cut 64 which extends outwardly from the inner surface 34a to the concentric cut 62. The step joints 48 and 50 are constructed in a cutting operation similar to the cutting operation of the radial slit 38a.

The step joints 48 and 50 are staggered or offset from each other and therefore the piston ring 26a does not have a significant opening whatsoever through which leakage can occur once the ring has shifted axially into the sealing position adjacent the piston groove wall 30 or 32. The ring 26a, like conventional piston rings, depends on differential pressure to make it work. The amount of differential pressure required to make piston rings of the present invention operate properly is relatively small because such piston rings are made from Teflon or Teflon related materials as aforesaid which have extremely low sliding friction when pressed against a cylinder wall and which, because of relatively low characteristic moduli of elasticity, tend to conform to the shape and size of the cylinder walls.

Conventional piston rings always have some nominal amount of joint gap through which leakage can occur but the piston ring 26a presents no such gap for leakage even when in a worn condition. As the ring 26a wears or the cylinder wall 28 bulges outwardly due to the pressure mentioned above, the radial cuts 54 and 58 of the step joint 48 and the radial cuts 60 and 64 of the step joint 50 open slightly as the ring 26a expands into the increased cylinder diameter. As can be seen in FIG. 4, the radial cuts 54 and 58 when open still do not present any direct passageway for fluid or gas since the radial slit 38a and the concentric cut 56 remain in a sealed condition due to pressure and the urging of the ring expander 44. This is also true for the other step joint 50. Since the projections 66 and 68 formed between the inner circumferential surface 36a and concentric cuts 56 and 62 respectively are disconnected from the piston ring proper on the inner side thereof by the radial slit 38a they are relatively easily urged outwardly to seal the concentric cuts 56 and 62. This is important because the extra flexibility provided by such a construction allows the seals at the concentric cuts 56 and 62 to be maintained even when the projections 70 and 72 thereabove become worn. The staggered step joints 48 and 50 also allow the piston ring 26a to seal the space between the piston 16 and the cylinder wall 28 even in instances where there are substantial variations in wall diameter along the bore of the cylinder 14.

As shown in FIGS. 5 and 6, piston rings 26b and 26c can be constructed having staggered step joints which are similar to those of piston ring 26a but which are also different in some respects. For example, piston ring 26b includes on opposite sides of the radial slit 38b, two step joints 48b and 50b whose outer axially aligned radial cuts 54b and 60b, which extend inwardly from the outer concentric surface 36b of the piston ring 26b to concentric cuts 56b and 62b respectively, are closer together than the inner axially aligned radial cuts 58b and 64b which extend outwardly from the inner concentric surface 34b thereof to the concentric cuts 56b and 62b respectively. The piston ring 26c of FIG. 6 is similar to the piston rings 26a and 26b except that the outer radial cuts 54c and 60c thereof on opposite sides of the radial slit 38c are approximately the same angle apart as are the inner radial cuts 58c and 64c thereof.

The piston ring 26d shown in FIG. 7 is similar to the ring 26a shown in FIG. 3. In the piston ring 26d, however, the outer radial cuts 74 and 76 and optionally the inner radial cuts 78 and 80 of the step joints 48d and 50d are not axially aligned but instead are canted or scarfed at some angle which is shown for illustrative purposes as 45°. The scarfed radial cuts 74, 76, 78 and 80 have been found to have superior sealing characteristics in some applications when compared to piston rings employing the axially aligned radial cuts such as are included in the piston ring 26a. This is because an axial fore component is produced from the wedging action caused by the application of differential pressure across the ring 26d. The result of the axial force is a tighter seal at the cuts 74, 76, 78 and 80. The scarfed radial cuts 74, 76, 78, and 80 also improve the sealing characteristics of the piston ring 26d as it begins to wear because the "coldflow" characteristic of the plastic material from which the piston ring 26d is preferably constructed causes any end gap to "grow" shut. This is shown in FIG. 8. FIG. 8 is a fragmented view of a portion of the piston ring 26d in a worn condition wherein the end gap at the radial cut 74 has been substantially closed by the coldflowing of the ring material into the end gap space which would otherwise be open to reduce the sealing efficiency of the ring 26d.

FIGS. 9 and 10 disclose other types of staggered step joints 48e and 50e, and 48f and 50f positioned on opposite sides of radial slits 38e and 38f as used in piston rings 26e and 26f respectively. The step joints 48e and 50e include axially aligned radial cuts 54e and 60e which extend inwardly from the outer concentric surface 36e thereof to meet with arculate cuts 82 and 84 which extend outwardly from the inner concentric surface 34e thereof as shown. The step joints 48f and 50f on the other hand, include axially aligned radial cuts 54f and 60f which extend inwardly from the outer concentric surface 36f thereof to outer concentric cuts 86 and 88. The step joints 48f and 50f also include axially aligned radial cuts 58f and 64f which extend from the inner concentric surface 34f thereof to inner concentric cuts 90 and 92. The radial cuts 54f and 58f, and 60f and 64f as shown, may be axially radially aligned with each other. The inner and outer concentric cuts 90 and 92, and 86 and 88 are joined by radial cuts 94 and 96 respectively which extend therebetween out of radial alignment both with each other and with the other radial cuts 54f, 58f, 60f and 64f.

It should be understood that all radial cuts may or may not be axially aligned, canted, scarfed, or inclined at some angle other than 90° to the side surfaces of the ring. It has also been found that it is advantageous to construct the rings 26b, 26c, 26d, 26e and 26f utilizing the methods above described for constructing piston ring 26a. This is because they are all preferably constructed of plastic materials such as Teflon or Teflon-like materials which are relatively easy to cut without removing material therefrom.

Thus there has been shown and described novel piston ring constructions and methods for manufacturing the same which fulfill all the objects and advantages sought therefor. Many changes, modifications, variations and other uses and applications of the subject piston rings and methods will, however, become apparent to those skilled in the art after considering the specification and the accompanying drawing. All such changes, modifications, alterations and other uses and applications which do not depart from the spirit and scope of the invention are deemed to be covered by the invention which is limited only by the claims which follow.

What is claimed is:

1. Means for sealing the space between a piston and a cylindrical wall comprising:

an annular member constructed from a closed ring of plastic material which material coldflows under pressure, said annular member being formed generally circularly about an axis with inner and outer concentric surfaces, first and second side surfaces and first and second mating end portions, said end portions including:

radial slits extending through predetermined arcs of said annular member generally perpendicular to the axis thereof;

first mating step surfaces on said first and second mating end portions extending between said inner and outer concentric surfaces and from said first side surface to said radial slits; and second mating step surfaces on said first and second mating end portions extending between said inner and outer concentric surfaces and from said second side surface to said radial slits, whereby said coldflow characteristic of said annular member enables said member to permanently deform at said first and second mating step surfaces to prevent gaps from forming between the surfaces thereof as said member or the cylindrical wall wears, said first mating step surfaces being spaced along the circumference of said annular member from said second mating step surfaces, and spaced within the predetermined arcs of said radial slits so that mating gaps cannot attempt to form between respective surfaces of said first and second mating step surfaces and so each first and second step surfaces are relatively free to move with respect to the portion of said annular member across said radial slits therefrom, thereby enabling said annular member to coldflow to seal any gaps which otherwise might form between said end portions.

2. Means for sealing the space between a piston and a cylindrical wall comprising:

an annular member constructed from a closed ring of plastic material which material coldflows under pressure, said annular member being formed generally circularly about an axis with inner and outer concentric surfaces, first and second side surfaces and first and second mating end portions, said end portions including:

radial slits extending through predetermined arcs of said annular member generally perpendicular to the axis thereof;

first mating step surfaces on said first and second mating end portions extending between said inner and outer concentric surfaces and from said first side surface to said radial slits; and second mating step surfaces on said first and second mating end portions extending between said inner and outer concentric surfaces and from said second side surface to said radial slits, whereby said coldflow characteristic of said annular member enables said member to permanently deform at said first and second mating step surfaces to prevent gaps from forming between the surfaces thereof as said member or the cylindrical wall wears, said first and second step surfaces including inner, outer and center portions, said center portions being generally parallel to said outer concentric surface, and said outer portions extending between said outer concentric surface and said center portions and being scarfed with respect to said first and second side surfaces, said outer portions being scarfed to increase the effect of pressure applied thereto when in operation sealing the space between the piston and cylindrical wall so that said scarfed end portions coldflow to prevent gaps from being formed therebetween as said annular member or the cylindrical wall wears.

3. The means defined in claim 2 wherein said inner portions of said first and second step surfaces extend between said inner concentric surface and said center portions and are orientated on planes which are generally parallel to the axis of said annular member.

4. The means defined in claim 1 wherein said inner portions of said first and second step surfaces extend between said inner concentric surface and said center portions and are scarfed with respect to said first and second side surfaces.

* * * * *